US012698402B2

(12) United States Patent
Naito et al.

(10) Patent No.: US 12,698,402 B2
(45) Date of Patent: Aug. 4, 2026

(54) CURABLE COMPOSITION, THREE-DIMENSIONAL OBJECT PRODUCING METHOD, THREE-DIMENSIONAL OBJECT PRODUCING APPARATUS, AND ARTIFICIAL TOOTH OBJECT

(71) Applicants:Hiroyuki Naito, Tokyo (JP); Yuki Shingai, Kanagawa (JP); Noriaki Okada, Kanagawa (JP)

(72) Inventors: Hiroyuki Naito, Tokyo (JP); Yuki Shingai, Kanagawa (JP); Noriaki Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 648 days.

(21) Appl. No.: 18/183,641

(22) Filed: Mar. 14, 2023

(65) Prior Publication Data

US 2023/0303852 A1 Sep. 28, 2023

(30) Foreign Application Priority Data

Mar. 22, 2022 (JP) ................................. 2022-046118

(51) Int. Cl.
*C09D 4/06* (2006.01)
*A61C 13/00* (2006.01)
(Continued)

(52) U.S. Cl.
CPC ............ *C09D 4/06* (2013.01); *A61C 13/0013* (2013.01); *A61C 13/08* (2013.01); *B33Y 70/00* (2014.12);
(Continued)

(58) Field of Classification Search
CPC ...................................................... C09D 4/06
See application file for complete search history.

(56) References Cited

U.S. PATENT DOCUMENTS

2013/0172441 A1* 7/2013 Takahata ............ A61C 13/0022
523/115
2017/0165152 A1* 6/2017 Eckert .................... A61K 6/887
(Continued)

FOREIGN PATENT DOCUMENTS

EP 3885412 9/2021
JP 2015-209470 11/2015
(Continued)

OTHER PUBLICATIONS

Extended European Search Report dated Aug. 11, 2023, in European Application No. 23161588.1, 9 pages.
(Continued)

*Primary Examiner* — Michael F Pepitone
(74) *Attorney, Agent, or Firm* — Grüneberg Global IP, PLLC

(57) ABSTRACT

A curable composition containing a radical-polymerizable monomer and a hard solid component having a volume average particle diameter of 10 nm or greater and 1,000 nm or less is provided. The content of the hard solid component is 3% by volume or greater and 40% by volume or less. The difference $(n_1-n_2)$ between the refractive index $(n_1)$ of a cured product of any other component than the hard solid component and the refractive index $(n_2)$ of the hard solid component is 0.04 or greater.

16 Claims, 2 Drawing Sheets

(51) Int. Cl.

| | | |
|---|---|---|
| *A61C 13/08* | (2006.01) |
| *B33Y 10/00* | (2015.01) |
| *B33Y 30/00* | (2015.01) |
| *B33Y 70/00* | (2020.01) |
| *C09D 7/40* | (2018.01) |
| *C09D 7/62* | (2018.01) |
| *C09D 135/02* | (2006.01) |
| *C09D 175/14* | (2006.01) |

(52) U.S. Cl.

CPC ................. *C09D 7/62* (2018.01); *C09D 7/67* (2018.01); *C09D 7/68* (2018.01); *C09D 135/02* (2013.01); *C09D 175/14* (2013.01); *B33Y 10/00* (2014.12); *B33Y 30/00* (2014.12)

(56) References Cited

U.S. PATENT DOCUMENTS

| | | | |
|---|---|---|---|
| 2022/0127386 A1 | 4/2022 | Watanabe et al. |
| 2022/0306880 A1 | 9/2022 | Shingai et al. |
| 2023/0131633 A1 | 4/2023 | Kimura et al. |
| 2023/0150020 A1 | 5/2023 | Tateishi et al. |

FOREIGN PATENT DOCUMENTS

| | | |
|---|---|---|
| JP | 6774659 | 10/2020 |
| JP | 2021-147581 | 9/2021 |
| JP | 2021-165025 A | 10/2021 |
| JP | 2022-147319 | 10/2022 |
| JP | 2023-018917 | 2/2023 |
| KR | 10-2020-0014606 | 2/2020 |
| WO | 2021/193962 A1 | 9/2021 |

OTHER PUBLICATIONS

Office Action received in Japanese Patent Application No. 2022-046118 on Sep. 30, 2025, 7 pages with English translation.

* cited by examiner

CURABLE COMPOSITION, THREE-DIMENSIONAL OBJECT PRODUCING METHOD, THREE-DIMENSIONAL OBJECT PRODUCING APPARATUS, AND ARTIFICIAL TOOTH OBJECT

CROSS-REFERENCE TO RELATED APPLICATION

The present application claims priority under 35 U.S.C. § 119 to Japanese Patent Application No. 2022-46118 filed Mar. 22, 2022. The contents of which are incorporated herein by reference in their entirety.

BACKGROUND OF THE INVENTION

1. Field of the Invention

The disclosures herein generally relate to a curable composition, a three-dimensional object producing method, a three-dimensional object producing apparatus, and an artificial tooth object.

2. Description of the Related Art

Techniques called Additive Manufacturing (AM) have been known as techniques for producing three-dimensional objects. The techniques calculate the shapes of cross-sections that are thinly sliced with respect to the layer lamination direction, form each layer according to the calculated shape, and laminate layers, to produce a three-dimensional object.

In recent years, among the additive manufacturing techniques, a material jetting method of deploying a curable composition at needed positions using an inkjet head, and curing the deployed curable composition by irradiation with active energy rays using, for example, a light irradiator, to produce a three-dimensional object has been gaining attention.

The material jetting method is mainly used for prototyping, and cured products need to have various properties such as strength, ductility, impact resistance, and heat resistance. As a method for improving these properties, a method of adding an inorganic filler to the curable composition is being attempted.

The features of the material jetting method include a coloring capability by use of color inks. Titanium oxide has been widely used as a coloring material for whitening of inks. However, titanium oxide has achieved classification into Carcinogenicity Category 2 in the European states recently (since September 2021), and stricter safety rules have been applied to titanium oxide. Hence, white inks free of titanium oxide and having few safety risks are in demand.

Up until now, photocurable resin compositions containing a reactive monomer, a reactive oligomer, a photopolymerization initiator, and ceramic particles have been proposed in order to produce objects having toughness (for example, see Japanese Patent No. 6774659).

SUMMARY OF THE INVENTION

In one embodiment, a curable composition contains a radical-polymerizable monomer and a hard solid component having a volume average particle diameter of 10 nm or greater and 1,000 nm or less. The content of the hard solid component is 3% by volume or greater and 40% by volume or less. The absolute value ($|n_1-n_2|$) of the difference between the refractive index (n) of a cured product of any other component than the hard solid component and the refractive index ($n_2$) of the hard solid component is 0.04 or greater.

DESCRIPTION OF THE PREFERRED EMBODIMENTS

Figure 1:
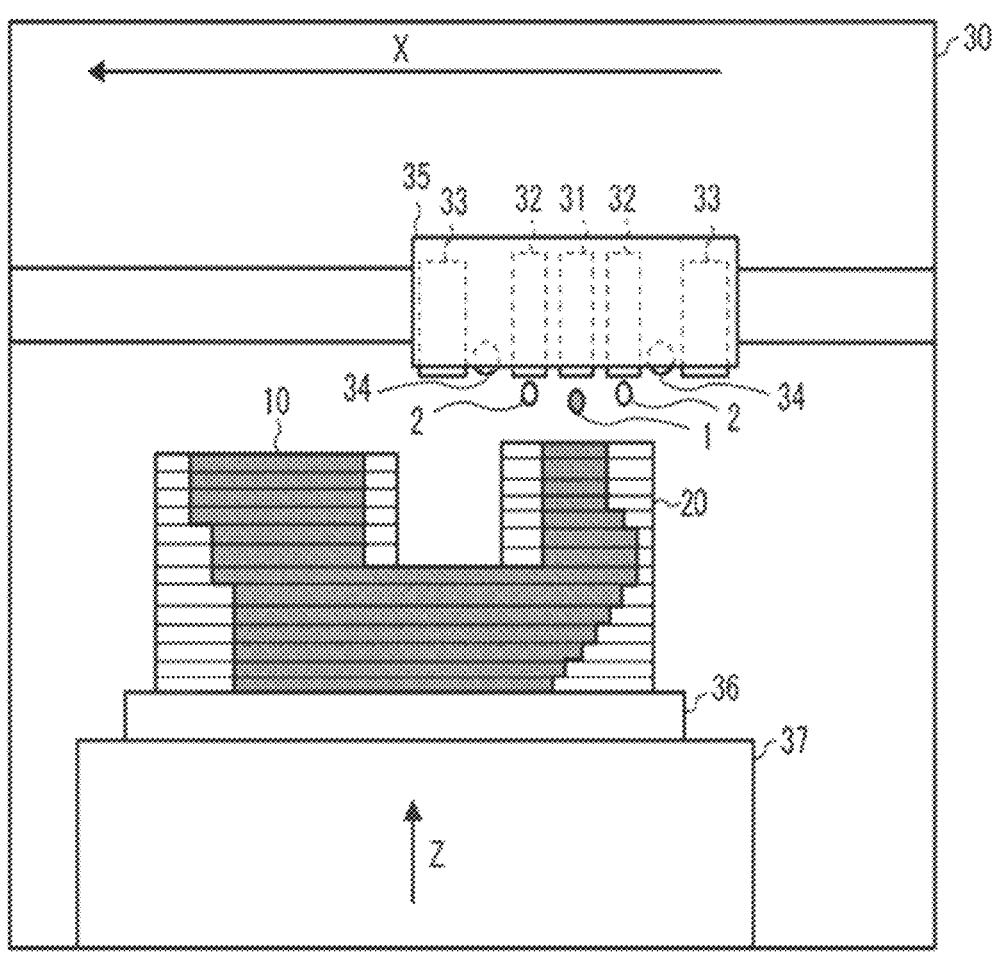
FIG. 1 is a schematic view illustrating an example of a three-dimensional object producing apparatus of the present disclosure.

In the following, embodiments of the present invention will be described with reference to the accompanying drawings.

(Curable Composition)

A curable composition of the present disclosure contains a radical-polymerizable monomer and a hard solid component having a volume average particle diameter of 10 nm or greater and 1,000 nm or less. The content of the hard solid component is 3% by volume or greater and 40% by volume or less. The absolute value ($|n_1-n_2|$) of the difference between the refractive index ($n_1$) of a cured product of any other component than the hard solid component and the refractive index ($n_2$) of the hard solid component is 0.04 or greater. The curable composition may further contain other components such as a polymerization initiator, a surfactant, a polymerization inhibitor, a coloring material, and a dispersant as needed.

"Curable compositions" are compositions that cure by being irradiated with active energy rays or being heated, and form cured products. Examples of the curable compositions include active-energy-ray-curable compositions and thermosetting compositions.

Use of only inkjet types among the curable compositions is preferable. Inkjet active-energy-ray-curable compositions and inkjet thermosetting compositions are preferable, and inkjet active-energy-ray-curable compositions are more preferable.

In the present disclosure, "curing" means forming a polymer. However, "curing" is not limited to hardening, but comprehends thickening, and simultaneous occurrence of hardening and thickening.

A "hardened product (cured product)" represents a polymer. However, it is not limited to a solid, but comprehends a thickened product and a mixture of a solid and a thickened product.

The present inventors have obtained the following findings through studies into the following problems of the existing techniques.

The existing techniques have used titanium oxide as white colorants. However, safety rules have been becoming stricter against titanium oxide, and a white ink having few safety risks without use of titanium oxide having a high hiding power is being demanded.

However, unless titanium oxide is used, it is difficult to secure a hiding power and whiteness. Hence, the present inventors have found a problem that the photocurable resin composition containing ceramic particles according to the existing technique (Japanese Patent No. 6774659) cannot obtain a sufficient whiteness. When a hard solid component is added to an active-energy-ray-curable composition, there is a problem that the viscosity of the composition increases and it may be difficult to discharge the composition by an inkjet method, so it is difficult to secure inkjet dischargeability of the composition while also securing whiteness and hardness of the composition after being cured.

The present disclosure is based on the above problems found in the existing techniques.

The present disclosure has an object to provide a curable composition that is free of titanium oxide and highly safe, inkjet-dischargeable, and having a high strength and a high whiteness after being cured.

The present disclosure can provide a curable composition that is free of titanium oxide and highly safe, inkjet-dischargeable, and having a high strength and a high whiteness after being cured.

[Absolute Value of Refractive Index Difference]

The absolute value ($|n_1 - n_2|$) of the difference between the refractive index ($n_1$) of a cured product of any other component than the hard solid component and the refractive index ($n_2$) of the hard solid component is 0.04 or greater, preferably 0.05 or greater, and more preferably 0.07 or greater.

When the absolute value of the refractive index difference is 0.04 or greater, the curable composition of the present disclosure can secure whiteness even without titanium oxide having a high hiding power and is highly safe, is inkjet-dischargeable, and has a high strength and a high whiteness after being cured.

The refractive index represents refractive index n25D measured under D-rays (light having a wavelength of 589.3 nm) of a sodium-vapor lamp at 25° C. by a B method using an Abbe's refractometer and stipulated by JIS K 7142. For example, it is possible to measure the refractive index using an Abbe's refractometer NAR-1T (available from Atago Co., Ltd.) under D-rays (589.3 nm) of a light source lamp.

It is possible to measure the refractive index ($n_1$) of a cured product of any other component than the hard solid component according to the following procedures.

First, a cured product of a product in which any other component(s) than the hard solid component is/are added or blended, or a cured product of a liquid component obtained by removing the hard solid component from the curable composition is produced. Next, the cured product is shaved with waterproof abrasive paper #400 or a metal file, and the refractive index of the obtained particles of the cured product of any other component than the hard solid component is measured.

Specifically, an average refractive index of the cured product of any other component than the hard solid component, calculated according to the procedures specified by the B method using an Abbe's refractometer and stipulated by JIS K 7142 is used as the refractive index ($n_1$) of the cured product of any other component than the hard solid component, where the B method specifies that "When the sample is a powder, a pellet, or a granule, a sample quantity necessary for five or more times of measurement is prepared, and the refractive index is measured five times. An average value having four significant digits is calculated".

It is possible to measure the refractive index ($n_2$) of the hard solid component by measuring the refractive index of the hard solid component as is, or of the hard solid component separated from the curable composition.

Specifically, an average refractive index of the hard solid component calculated according to the procedures specified by the B method using an Abbe's refractometer and stipulated by JIS K 7142 is used as the refractive index ($n_2$) of the hard solid component, where the B method specifies that "When the sample is a powder, a pellet, or a granule, a sample quantity necessary for five or more times of measurement is prepared, and the refractive index is measured five times. An average value having four significant digits is calculated".

It is possible to identify the hard solid component and any other component than the hard solid component from a cured product, a three-dimensional object, and an artificial tooth object that are obtained by curing the curable composition. Specifically, it is possible to identify the hard solid component and any other component than the hard solid component that are contained in the curable composition by, for example, pyrolytic Gas Chromatography-Mass Spectrometry (GC-MS), Fourier-Transform InfraRed spectroscopy (FT-IR), micro-Raman spectroscopy, various methods of Nuclear Magnetic Resonance (NMR), and Time-Of-Flight Secondary Ion Mass Spectrometry (TOF-SIMS). The refractive index ($n_1$) of the cured product of any other component than the hard solid component and the refractive index ($n_2$) of the hard solid component can be measured according to the procedures specified above.

<Hard Solid Component>

The hard solid component is a hard solid component having a volume average particle diameter of 10 nm or greater and 1,000 nm or less.

The hard solid component can improve, for example, elastic modulus, strength, and impact resistance of a cured product of the curable composition.

"Hardness" represents a property that makes shape changes less likely to occur in response to an external stress.

Persons skilled in the art can determine whether something is hard according to the criteria known in the art. Examples of the criteria include Vickers hardness and elastic modulus.

In a preferred embodiment, the elastic modulus of the hard solid component is 4 GPa or higher, and more preferably 5 GPa or higher.

The elastic modulus can be measured by, for example, JIS K 7161, JIS K 7171, and ISO 14577.

Examples of the hard solid component include glass, silica, alumina, zirconia, calcium carbonate, wollastonite, xonotlite, gypsum fiber, aluminum borate, aramid fiber, carbon fiber, glass fiber, talc, mica, glass flake, polyoxybenzoyl whisker, and various resins.

Among these materials, silica, alumina, zirconia, and calcium carbonate are preferable and silica is more preferable in terms of an excellent whiteness.

A "solid component" represents a component that can maintain a solid state in the curable composition.

It is preferable that the solid component be particles in the curable composition at normal temperature at normal pressure.

Moreover, it is preferable that the solid component be dispersed in the curable composition.

The content of the hard solid component is 3% by volume or greater and 40% by volume or less, preferably 5% by volume or greater and 30% by volume or less, and more preferably 10% by volume or greater and 30% by volume or less relative to the whole volume of the composition.

When the content of the hard solid component is 3% by volume or greater, a sufficient hiding power can be obtained, and a high whiteness can be obtained after curing. When the content of the hard solid component is 40% by volume or less, it is possible to inhibit the viscosity of the curable composition from being excessively high and obtain a curable composition suitable for inkjet discharging, and to inhibit reduction in the bindability of a matrix resin after the curable composition is cured and inhibit the cured product from becoming brittle as a result. Moreover, when the content of the hard solid component is 5% by volume or greater, improved hiding power, whiteness, and hardness can be obtained in a cured product. When the content of the hard solid component is 30% by volume or less, it is possible to obtain a more stable inkjet dischargeability and cured product hardness.

It is known that the viscosity of a composition increases as the content of a solid component is increased. It is generally preferable that the viscosity of a curable composition used for being discharged by an inkjet method be low.

A matrix resin represents a cured resin other than the hard solid component and surrounding the hard solid component in a cured product obtained by curing the curable composition.

The shape of the hard solid component is not particularly limited and may be appropriately selected in accordance with the intended purpose. The hard solid component may have a spherical shape, a rod shape, or an irregular shape, or may be hollow particles, porous particles, and core-shell particles. Among these shapes, spherical particles are preferable in terms of dispersibility and inkjet dischargeability.

The "spherical shape" is not limited to a true spherical shape, but encompasses, for example, a spheroid and a polyhedron. For example, the "spherical shape" according to the present disclosure includes, but is not limited to, a particle in which a diameter (longer diameter) that extends over the longest length to the contour by passing the center of the particle is approximately twice as long as a diameter (shorter diameter) that extends over the shortest length to the contour by passing the center of the particle. The ratio of the shorter diameter to the longer diameter is preferably from 1:1 through 1:5, and more preferably from 1:1 through 1:2.

The volume average particle diameter of the hard solid component is 10 nm or greater and 1,000 nm or less, preferably 100 nm or greater and 500 nm or less, more preferably 180 nm or greater and 500 nm or less, and yet more preferably 180 nm or greater and 300 nm or less.

When the volume average particle diameter of the hard solid component is 10 nm or greater, it is possible to improve inkjet discharging stability by inhibiting thickening due to any increase in the surface area of the solid component, and to obtain a sufficient hiding power and a sufficient whiteness. When the volume average particle diameter of the hard solid component is 1,000 nm or less, it is possible to improve inkjet discharging stability. When the volume average particle diameter of the hard solid component is 100 nm or greater and 500 nm or less, a more stable inkjet dischargeability can be obtained, and improved better hiding power, whiteness, and hardness can be obtained in a cured product. Furthermore, when dispersion stability of the solid component in the curable composition is taken into consideration, the volume average particle diameter of the hard solid component is preferably 300 nm or less.

The volume average particle diameter and the granularity distribution can be measured with, for example, a granularity analyzer (MICROTRAC MODEL UPA9340, available from Nikkiso Co., Ltd.).

—Surface Modification—

When the hard solid component is one that has a hydroxyl group on the surface, such as glass, silica, and alumina, it is preferable to use the hard solid component by surface-modifying the hard solid component with a silane coupling agent. Among such surface-modified hard solid components, silica surface-modified with a silane coupling agent is preferable.

The silane coupling agent is not particularly limited and may be appropriately selected in accordance with the intended purpose. Examples of the silane coupling agent include vinyl methoxysilane, vinyl ethoxysilane, 2-(3,4-epoxycyclohexyl)ethyl trimethoxysilane, 3-glycidoxypropylmethyl dimethoxysilane, 3-glycidoxypropyl trimethoxysilane, 3-glycidoxypropylmethyl diethoxysilane, 3-glycidoxypropyl triethoxysilane, styryl p-styryltrimethoxysilane, 3-methacryloxypropylmethyl dimethoxysilane, 3-methacryloxypropyl trimethoxysilane, 3-methacryloxypropylmethyl diethoxysilane, 3-methacryloxypropyl triethoxysilane, 3-acryloxypropyl trimethoxysilane, N-2-(aminoethyl)-3-aminopropylmethyl dimethoxysilane, N-2-(aminoethyl)-3-aminopropylmethyl dimethoxysilane, 3-aminopropyl trimethoxysilane, 3-aminopropyl triethoxysilane, 3-triethoxysilyl-N-(1,3-dimethyl-butylidene)propylamine, N-phenyl-3-aminopropyl trimethoxysilane, hydrochlorides of N-(vinylbenzyl)-2-aminoethyl-3-aminopropyl trimethoxysilane, tris-(trimethoxysilylpropyl)isocyanurate, 3-ureidopropyl trialkoxysilane, 3-mercaptopropylmethyl dimethoxysilane, 3-mercaptopropyl trimethoxysilane, 3-isocyanate propyl triethoxysilane, and 3-trimethoxysilylpropyl succinic anhydride. One of these silane coupling agents may be used alone or two or more of these silane coupling agents may be used in combination.

Among these silane coupling agents, silane coupling agents containing an unsaturated double bond, such as vinyl methoxysilane, 3-methacryloxypropylmethyl dimethoxysilane, and 3-acryloxypropyl trimethoxysilane, are particularly preferable.

<Any Other Component than Hard Solid Component>

Any other component in the curable composition, which is a liquid component in the curable composition, than the hard solid component includes a radical-polymerizable monomer, preferably includes a radical-polymerizable oligomer, and further includes other components such as a polymerization initiator, a surfactant, a polymerization inhibitor, a coloring material, a dispersant, an organic solvent, and water as needed.

In the present disclosure, a liquid component represents a component that is liquid at normal temperature at normal pressure.

<<Radical-Polymerizable Monomer>>

By using a radical-polymerizable monomer as a radical-polymerizable compound, it is possible to better inhibit increase in the viscosity of the curable composition.

By using a radical-polymerizable monofunctional monomer as a radical-polymerizable compound, it is possible to further inhibit increase in the viscosity of the curable composition.

A "radical-polymerizable compound" represents a compound that can form a polymer through radical polymerization. A radical-polymerizable compound typically is a compound as a monomer unit containing one or more radical-polymerizable functional groups. Examples of the radical-polymerizable compound include radical-polymerizable monomers such as radical-polymerizable monofunctional monomers and radical-polymerizable multifunctional monomers, and radical-polymerizable oligomers. One of these radical-polymerizable compounds may be used alone or two or more of these radical-polymerizable compounds may be used in combination.

When a radical-polymerizable compound is used as a polymerizable compound in the curable composition of the present disclosure, increase in the viscosity of the curable composition is inhibited, and the polymerization speed of the curable composition can be improved, compared with when a cation-polymerizable compound is used. Hence, the curable composition can be suitably used in an inkjet method.

Examples of the radical-polymerizable monofunctional monomer include (meth)acrylic-based monomers, (meth) acrylamide, N,N-dimethyl (meth)acrylamide, N-isopropyl (meth)acrylamide, (meth)acryloylmorpholine, and hydroxy-ethyl (meth)acrylamide. One of these radical-polymerizable monofunctional monomers may be used alone or two or more of these radical-polymerizable monofunctional mono-mers may be used in combination. Among these radical-polymerizable monofunctional monomers, (meth)acrylic-based monomers are preferable.

Examples of the (meth)acrylic-based monomers include isobornyl (meth)acrylate, 2-ethylhexyl (meth)acrylate, 2-hy-droxyethyl (meth)acrylate, 2-hydroxypropyl (meth)acrylate, caprolactone-modified tetrahydrofurfuryl (meth)acrylate, 3-methoxybutyl (meth)acrylate, tetrahydrofurfuryl (meth) acrylate, lauryl (meth)acrylate, 2-phenoxyethyl (meth)acry-late, isodecyl (meth)acrylate, isooctyl (meth)acrylate, tri-decyl (meth)acrylate, caprolactone (meth)acrylate, and ethoxylated nonylphenol (meth)acrylate.

Examples of the radical-polymerizable multifunctional monomer include bifunctional monomers and trifunctional or greater monomers. One of these radical-polymerizable multifunctional monomers may be used alone or two or more of these radical-polymerizable multifunctional mono-mers may be used in combination.

Examples of the bifunctional radical-polymerizable mul-tifunctional monomer include dipropylene glycol di(meth) acrylate, diethylene glycol di(meth)acrylate, tripropylene glycol di(meth)acrylate, triethylene glycol di(meth)acrylate, tetraethylene glycol di(meth)acrylate, polypropylene glycol di(meth)acrylate, neopentyl glycol hydroxypivalic acid ester di(meth)acrylate, hydroxypivalic acid neopentyl glycol ester di(meth)acrylate, 1,3-butanediol di(meth)acrylate, 1,4-bu-tanediol di(meth)acrylate, 1,6-hexanediol di(meth)acrylate, 1,9-nonanediol di(meth)acrylate, diethylene glycol di(meth) acrylate, neopentyl glycol di(meth)acrylate, tripropylene glycol di(meth)acrylate, tricyclodecane dimethanol di(meth) acrylate, caprolactone-modified hydroxypivalic acid neo-pentyl glycol ester di(meth)acrylate, propoxylated neopentyl glycol di(meth)acrylate, ethoxy-modified bisphenol A di(meth)acrylate, polyethylene glycol 200 di(meth)acrylate, and polyethylene glycol 400 di(meth)acrylate. One of these bifunctional radical-polymerizable multifunctional mono-mers may be used alone of two or more of these bifunctional radical-polymerizable multifunctional monomers may be used in combination.

Examples of the trifunctional or greater radical-polymer-izable multifunctional monomer include trimethylolpropane tri(meth)acrylate, pentaerythritol tri(meth)acrylate, dipen-taerythritol hexa(meth)acrylate, triallyl isocyanurate, ε-caprolactone-modified dipentaerythritol tri(meth)acrylate, ε-caprolactone-modified dipentaerythritol tetra(meth)acry-late, (meth)acrylate, ε-caprolactone-modified dipentaeryth-ritol penta(meth)acrylate, ε-caprolactone-modified dipen-taerythritol hexa(meth)acrylate, tris(2-hydroxyethyl) isocyanurate tri(meth)acrylate, ethoxylated trimethylolpro-pane tri(meth)acrylate, propoxylated trimethylolpropane tri (meth)acrylate, propoxylated glyceryl tri(meth)acrylate, pentaerythritol tetra(meth)acrylate, ditrimethylolpropane tetra(meth)acrylate, dipentaerythritol hydroxypenta(meth) acrylate, ethoxylated pentaerythritol tetra(meth)acrylate, and penta(meth)acrylate ester. One of these trifunctional or greater radical-polymerizable multifunctional monomers may be used alone or two or more of these trifunctional or greater radical-polymerizable multifunctional monomers may be used in combination.

The content of the radical-polymerizable monomer is preferably 50.0% by mass or greater and more preferably 60.0% by mass or greater relative to the whole amount of the curable composition. The content of the radical-polymeriz-able monomer is preferably 95.0% by mass or less and more preferably 85.0% by mass or less.

<<Radical-Polymerizable Oligomer>>

By using a radical-polymerizable oligomer as a radical-polymerizable compound, it is possible to reduce cure shrinkage of a cured product, and to improve extensibility and toughness of a cured product.

As the radical-polymerizable oligomer, for example, a monofunctional or greater and hexafunctional or less oli-gomer is preferable, and a bifunctional or greater and trifunctional or less oligomer is more preferable. One of these radical-polymerizable oligomers may be used alone or two or more of these radical-polymerizable oligomers may be used in combination.

It is preferable that the radical-polymerizable oligomer contains a hydrogen-bonding functional group, because this promotes interaction between side chains of a polymer, and improves toughness of a cured product. A radical-polymer-izable oligomer containing a urethane group is more pref-erable in terms of satisfying both of viscosity and hydrogen bonding property. Examples of the hydrogen-bonding func-tional group include a urea group, a urethane group, an amide group, a hydroxyl group, and a carboxylic acid group. As the radical-polymerizable oligomer containing a ure-thane group, a urethane acrylate oligomer is more prefer-able.

As the radical-polymerizable oligomer, a commercially available product can be used. Examples of the commer-cially available product include UV-6630B (UV-curable urethane acrylate oligomer, having a molecular weight of 3,000, having 2 polymerizable functional groups, available from Nippon Synthetic Chemical Industry Co., Ltd.), and CN983NS (aliphatic urethane acrylate oligomer, having 2 polymerizable functional groups, available from Sartomer USA, LLC). One of these commercially available products may be used alone or two or more of these commercially available products may be used in combination.

As mentioned above, examples of the radical-polymeriz-able compound include acrylic-based monomers, meth-acrylic-based monomers, and carboxylic acid vinyl ester-based monomers. It is preferable to use acrylic-based monomers. An acrylic-based monomer can inhibit increase in the viscosity of the curable composition, and can improve the polymerization speed. Therefore, it is suitable to use an acrylic-based monomer for an inkjet method.

When using a radical-polymerizable monofunctional monomer other than an acrylic-based monomer or an epoxy-based monomer, it is preferable to use it in combination with an acrylic-based monomer. Examples of the epoxy-based monomer include bis(3,4 epoxycyclohexyl), and bisphenol A diglycidyl ether. When using an epoxy-based monomer in combination with an acrylic-based monomer, it is preferable to further use an oxetane monomer in combination.

The content of the radical-polymerizable oligomer is preferably 1.0% by mass or greater and 40.0% by mass or less relative to the whole amount of the composition. The lower limit of the content of the radical-polymerizable oligomer is more preferably 10.0% by mass or greater, and the upper limit of the content of the radical-polymerizable oligomer is more preferably 30.0% by mass or less.

When the liquid component contains a radical-polymerizable compound other than the radical-polymerizable monomer, the content of radical-polymerizable compounds including the radical-polymerizable monomer is preferably 50.0% by mass or greater, more preferably 60.0% by mass or greater, yet more preferably 70.0% by mass or greater, and particularly preferably 80.0% by mass or greater relative to the whole amount of the composition. The content of radical-polymerizable compounds including the radical-polymerizable monomer is preferably 95.0% by mass or less and more preferably 90.0% by mass or less.

<<Polymerization Initiator>>

As the polymerization initiator, a desirably selected substance that generates radicals in response to irradiation with light (particularly, ultraviolet rays having a wavelength of from 220 nm through 400 nm) can be used. One such substance may be used alone or two or more such substances may be used in combination.

Examples of the polymerization initiator include acetophenone, 2, 2-diethoxyacetophenone, p-dimethylaminoacetophenone, benzophenone, 2-chlorobenzophenone, p,p'-chlorobenzophenone, p,p-bisdiethylaminobenzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, thioxanthone, 2-chlorothioxanthone, 2-hydroxy-2-methyl-1-phenyl-1-one, 1-(4-isopropylphenyl) 2-hydroxy-2-methylpropan-1-one, methyl benzoyl formate, 1-hydroxycyclohexyl phenyl ketone, azobis isobutyronitrile, benzoyl peroxide, and di-tert-butyl peroxide. One of these polymerization initiators may be used alone or two or more of these polymerization initiators may be used in combination.

The content of the polymerization initiator is preferably 0.1% by mass or greater and 10.0% by mass or less and more preferably 1.0% by mass or greater and 5.0% by mass or less relative to the whole amount of the curable composition.

<Other Components>

The other components are not particularly limited and may be appropriately selected in accordance with the intended purpose. Examples of the other components include a surfactant, a polymerization inhibitor, a coloring material, a viscosity modifier, an antioxidant, a crosslinking accelerator, an ultraviolet absorbent, a plasticizer, a preservative, a solvent, and a dispersant.

<<Surfactant>

As the surfactant, for example, a compound having a molecular weight of 200 or greater and 5,000 or less is preferable. Specific examples of such a surfactant include PEG-type nonionic surfactants [e.g., an adduct of nonylphenol with from 1 mole through 40 moles of ethylene oxide (hereinafter, abbreviated as EO), and an adduct of stearic acid with from 1 mole through 40 moles of EO], multivalent alcohol-type nonionic surfactants (e.g., sorbitan palmitic acid monoester, sorbitan stearic acid monoester, and sorbitan stearic acid trimester), fluorine-containing surfactants (e.g., an adduct of perfluoroalkyl with from 1 mole through 50 moles of EO, perfluoroalkyl carboxylate, and perfluoroalkyl betaine), and modified silicone oils [e.g., polyether-modified silicone oil and (meth)acrylate-modified silicone oil]. One of these surfactants may be used alone or two or more of these surfactants may be used in combination.

<<Polymerization Inhibitor>>

Examples of the polymerization inhibitor include phenol compounds [e.g., hydroquinone, hydroquinone monomethyl ether, 2,6-di-t-butyl-p-cresol, 2,2-methylene-bis-(4-methyl-6-t-butylphenol), and 1,1,3-tris-(2-methyl-4-hydroxy-5-t-butylphenyl)butane], sulfur compounds [e.g., dilauryl thio dipropionate], phosphorus compounds [e.g., triphenyl phosphite], and amine compounds [e.g., phenothiazine]. One of these polymerization inhibitors may be used alone or two or more of these polymerization inhibitors may be used in combination.

<<Coloring Material>>

The curable composition may contain a coloring material. However, it is preferable that the curable composition be free of a coloring material when it is intended to make a cured product of the curable composition white.

The coloring material represents, for example, a dye or a pigment. As described above, the coloring material is functionally distinguished from the hard solid component.

In the present specification, when it is said that the curable composition is "substantially free of" the coloring material, it is meant that the curable composition does not contain the coloring material to an extent at which, for example, the properties of the coloring material affect the curable composition. It is preferable that the content of the coloring material be less than 0.1% by mass relative to the whole mass of the curable composition.

<<Dispersant>>

The dispersant is an additive that has a function of adsorbing to the surface of a solid component to make the solid component stably disperse in the curable composition. As the dispersant, a publicly-known dispersant can be appropriately used.

<<Organic Solvent>>

The curable composition optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the "organic solvent" represents a common non-reactive organic solvent, for example, ether, ketone, xylene, ethyl acetate, cyclohexanone, and toluene, which is clearly distinguished from polymerizable compounds. Furthermore, "free of" an organic solvent means that no organic solvent is substantially contained (for example, to an extent at which, for example, the properties of the organic solvent affect the composition). The content thereof is preferably less than 0.1% by mass.

<<Water>>

The curable composition optionally contains water although it is preferable that the curable composition be free of water, if possible. "Free of" water means that no water is substantially contained (for example, to an extent at which, for example, the properties of the water affect the composition). The content thereof is preferably less than 1.0% by mass. When the content of the water is less than or equal to a certain amount, it is possible to inhibit, for example, reduction in curing speed, reduction in curing strength, increase in water absorbency, and reduction in separability from a support part forming material described below.

[Properties of Curable Composition]

[Viscosity]

It is preferable that a curable composition that can be suitably used in an inkjet method has a low viscosity, in terms of, for example, dischargeability through a nozzle. Hence, according to an aspect, the viscosity of the curable composition is preferably 1,000 mPa s or lower, more preferably 500 mPa·s or lower, yet more preferably 400 mPa·s or lower, and particularly preferably 300 mPa·s or lower at 25° C.

The viscosity of the curable composition is preferably 6 mPa·s or higher at 25° C. in terms of dischargeability and object production accuracy. During object production, by adjusting the temperature of an inkjet head or of an ink flow path, it is possible to adjust the viscosity of the active-energy-ray-curable composition.

The viscosity can be measured by a routine method. For example, the method stipulated by JIS Z 8803 can be used. Other than this, for example, the viscosity can be measured by a cone plate rotary viscometer (VISCOMETER TVE-22L, manufactured by TOKI SANGYO CO., LTD.) using a cone rotor (1°34'×R24) at a number of rotation of 50 rpm with a setting of the temperature of hematothermal circulating water in the range of 20° C. to 65° C. VISCOMATE VM-150III can be used for the temperature adjustment of the circulating water.

[Safety]

It is possible to evaluate safety items such as those relating to carcinogenicity, by checking Safety Data Sheet (SDS) of each component (material) of the curable composition.

[Surface Tension]

The surface tension of a composition that can be used in an inkjet method is preferably 20 mN/m or higher and 40 mN/m or lower at 25° C. in terms of discharging stability and object production accuracy. Hence, according to an aspect, the surface tension of the curable composition is preferably 20 mN/m or higher and 40 mN/m or lower at 25° C.

[Method for Producing Curable Composition]

The method for producing the curable composition is not particularly limited, and a method using the various components mentioned above may be appropriately selected in accordance with the intended purpose. For example, it is possible to prepare the curable composition by subjecting, for example, the radical-polymerizable monomer, and as needed, the other components to a dispersion treatment using a dispersing machine such as a ball mill, a kitty mill, a disk mill, a pin mill, and a DYNO-MILL to mix the components uniformly, and further mixing the resulting product with the hard solid component.

(Three-Dimensional Object and Artificial Tooth Object)

A three-dimensional object of the present disclosure is a three-dimensional object obtained by curing the curable composition of the present disclosure.

The three-dimensional object can be provided as a three-dimensional object free of titanium oxide and highly safe, and having a high strength and a high whiteness after curing. The curable composition of the present disclosure containing the hard solid component can impart a good mechanical property to the three-dimensional object (material-jetted model) produced by laminating cured products.

The three-dimensional object can be suitably used as, for example, dental materials such as artificial teeth, eyeglass frames, shoe outsoles and middle soles, grips such as wheel grips, hearing aids, earphones, denture bases, and prosthetic limbs. Among these objects, artificial tooth objects are preferable.

According to an embodiment, it is preferable that: the three-dimensional object and an artificial tooth object of the present disclosure contain a hard solid component having a volume average particle diameter of 10 nm or greater and 1,000 nm or less;

12 the content of the hard solid component be 3% by volume or greater and 40% by volume or less;

the absolute value $(|n_1-n_2|)$ of the difference between the refractive index $(n_1)$ of a cured product of any other component than the hard solid component and the refractive index $(n_2)$ of the hard solid component be 0.04 or greater;

the hard solid component be spherical particles, and 50% by number of the primary particles of the spherical particles be distributed separately from one another; and the total light transmittance through the artificial tooth object when the artificial tooth object having an average thickness of 1 mm is used be 30% or lower.

The particulars that have been specified about the curable composition may be appropriately selected and applied to each mentioned component and property.

As regards whether the hard solid component is spherical particles and whether 50% by number of the primary particles of the spherical particles are distributed separately from one another, it is possible to confirm that spherical particles are dispersed uniformly, by cracking the three-dimensional object or the artificial tooth object with, for example, a hammer, or dissecting the three-dimensional object or the artificial tooth object by cutting, and observing the cross-section with a Scanning Electron Microscope (SEM) or a Transmission Electron Microscope (TEM).

In the present specification, an "artificial tooth" represents a tooth that is formed artificially to be used in order to restore the function of a natural tooth that is lost due to, for example, dental caries, trauma, and gum disease, and a laminate that is attached to the surface of a natural tooth in order to improve aesthetics.

Examples of a part of the tooth include an inlay, an onlay, a crown, and a bridge.

Examples of the whole of the tooth include an implant, and a denture such as a false tooth.

[Total Light Transmittance]

The total light transmittance through the three-dimensional object and a cured product of the curable composition is preferably 40% or lower and more preferably 30% or lower in terms of whiteness.

It is possible to measure the total light transmittance, by producing a test piece of a three-dimensional object (or of a cured product of the curable composition) having an average thickness of 1 mm, and measuring the total light transmittance through the test piece in the direction of the thickness.

Specifically, it is possible to measure the total light transmittance by the method described below.

Figure 2:
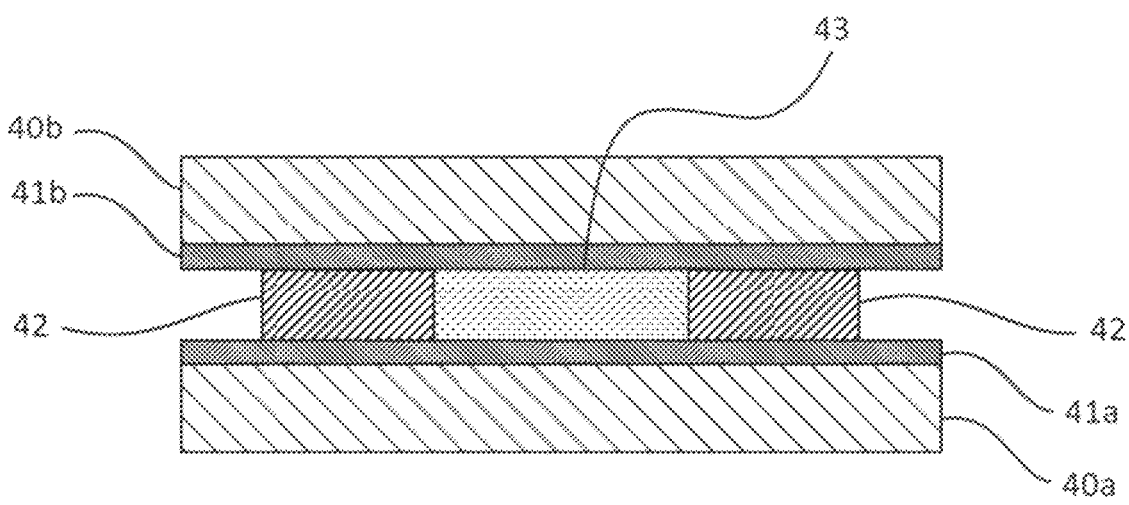
FIG. 2 is a view illustrating an example of a method for producing a sample for measuring total light transmittance in Example.

As illustrated in FIG. 2, an OHP sheet is placed on a glass substrate, and a silicon mold (shape: a length of 20 mm on each side, and an average thickness of 1 mm) is tightly attached on the OHP sheet. Next, the silicon mold is filled with the curable composition and covered with an OHP sheet, which is further covered with a glass plate.

Next, using an ultraviolet irradiator (available from Ushio Inc., UNIJET E110Z HD_385 nm, having a wavelength of 385 nm), the curable composition is irradiated with ultraviolet rays having an irradiation intensity of 200 mW/cm$^2$ for 5 minutes through the glass plate. Next, the curable composition is irradiated with ultraviolet rays having an irradiation intensity of 500 mW/cm$^2$ for 5 minutes through the glass plate at the side opposite to the side irradiated with ultraviolet rays just before. Next, the OHP sheet is peeled, and the test piece is taken out from the silicon mold and left in a stationary state in an environment at a temperature of 23° C. at a relative humidity of 50% for 24 hours, to obtain a test piece having an average thickness of 1 mm.

The total light transmittance (Tt) through the test piece produced above is measured using DIRECT READING HAZEMETER (available from Toyo Seiki Seisaku-sho, Ltd.) according to JIS K7361-1/HAZE:JIS K7136.

Examples of the method for measuring the total light transmittance through the three-dimensional object and the artificial tooth object include a method of measuring the total light transmittance through a processed product obtained by processing the three-dimensional object or the artificial tooth object to a thickness of 1 mm using a metal file or by cutting, polishing both sides of the object with waterproof abrasive paper P600 or with anything of the same level, and glossily polishing both sides of the object with alumina abrasive powder suspended in water and with felt.

Whatever size the processed product or the portion cut out from the three-dimensional object has or whatever measuring instrument is used, it is possible to measure the total light transmittance through the processed product, so long as the measurement includes the step of polishing both sides of the processed product with waterproof abrasive paper P600 or with anything of the same level, and glossily polishing both sides of the processed product with alumina abrasive powder suspended in water and with felt.

[Bending Strength]

The bending strength of the three-dimensional object and a cured product of the curable composition is preferably 50 MPa or higher in terms of shape retention, preferably 80 MPa or higher when the three-dimensional object or the cured product is used as an artificial tooth, more preferably 100 MPa or higher in terms of durability and quality, and particularly preferably 120 MPa or higher.

It is possible to measure the bending strength by measuring the bending strength of a test piece of a three-dimensional object (or a cured product of the curable composition) having a rectangular shape having a size of 10 mm×40 mm×1 mm.

Specifically, the bending strength can be measured by the method described below.

A tank leading to an inkjet head (MH2810, available from Ricoh Company, Ltd.) of a three-dimensional object producing apparatus is filled with the curable composition, and the curable composition is discharged from the inkjet head onto a base. Next, using an ultraviolet irradiator (available from Ushio Inc., UNIJET E110Z HD, having a wavelength of 385 nm), the curable composition discharged onto the base is irradiated with a light quantity of 300 mJ/cm$^2$, to cure the curable composition on the base. These processes are repeated, to produce a three-dimensional object having a rectangular shape having a size of 10 mm×40 mm×1 mm.

A universal tester (AUTOGRAPH, model No. AG-I, available from Shimadzu Corporation), a load cell for 1 kN, and a three-point bending jig are applied to each obtained three-dimensional object having a rectangular shape having a size of 10 mm×40 mm×1 mm. Stress that occurs when the distance between the fulcrums is 24 mm and the load point is displaced at a speed of 1 mm/minute is plotted with respect to the amount of strain, and the stress at the breaking point is determined as the maximum stress.

As regards extensibility, the tensile elongation at break is preferably 3% or greater, and more preferably 8% or greater. The extensibility represents extensibility measured by a tensile test (e.g., JIS K7161, JIS K7113, ISO 527, and ASTM D638).

As regards heat resistance, the deflection temperature (HDT) under load is preferably 50° C. or higher.

As regards impact resistance, the Izod impact strength is preferably 20 J/m or higher, and more preferably 40 J/m or higher. The heat resistance represents heat resistance measured by a deflection temperature (HDT) under load test (e.g., JIS K7191-1, and ASTM D648).

(Three-Dimensional Object Producing Method and Three-Dimensional Object Producing Apparatus)

A three-dimensional object producing method of the present disclosure includes a discharging step of discharging the curable composition of the present disclosure by an inkjet method, and a curing step of curing the discharged curable composition by irradiation with active energy rays, includes repeating the discharging step and the curing step in order, and further includes other steps as needed.

A three-dimensional object producing apparatus of the present disclosure includes a storage container storing the curable composition of the present disclosure, a discharging unit configured to discharge the curable composition by an inkjet method, and a curing unit configured to cure the discharged curable composition by irradiation with active energy rays, and further includes other units as needed.

<Discharging Step and Discharging Unit>

The discharging step is a step of discharging the curable composition by an inkjet method, and can be suitably performed by the discharging unit.

The discharging unit is a unit configured to discharge the curable composition by an inkjet method.

In the discharging step, it is preferable to discharge the curable composition onto a stage having an ascending/descending function by an inkjet method. The curable composition discharged onto the stage forms a liquid film.

<Curing Step and Curing Unit>

The curing step is a step of curing the discharged curable composition by irradiation with active energy rays, and can be suitably performed by the curing unit.

The curing unit is a unit configured to cure the discharged curable composition by irradiation with active energy rays.

In the curing step, the liquid film formed of the curable composition on the stage is cured by irradiation with active energy rays.

—Active Energy Rays—

The active energy rays used for curing the curable composition are not particularly limited, so long as they are able to give necessary energy for allowing polymerization reaction of polymerizable components in the composition to proceed. The active energy rays are preferably light and preferably ultraviolet rays having a wavelength of from 220 nm through 400 nm, and may be electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Other Steps and Other Units>

Examples of the other steps include a smoothing step.

Examples of the other units include a smoothing unit.

<<Smoothing Step and Smoothing Unit>>

The smoothing step is a step of smoothing a surface of the liquid film formed of the curable composition discharged in the discharging step.

In the smoothing step, any excessive portion of the discharged curable composition is scraped away, to smooth out roughness of the liquid film or the layer formed of the curable composition.

The smoothing step is suitably performed by the smoothing unit

The smoothing unit is not particularly limited and may be appropriately selected in accordance with the intended purpose. Examples of the smoothing unit include a roller.

The three-dimensional object producing method of the present disclosure produces a three-dimensional object having a desired shape by repeating the discharging step and the curing step in order.

The three-dimensional object producing method and the three-dimensional object producing apparatus will be described below by taking, for example, a case where the curable composition of the present disclosure is used as a model part forming material. However, the use of the curable composition of the present disclosure is not limited to this embodiment.

FIG. 1 is a schematic view illustrating an example of the three-dimensional object producing apparatus of the present disclosure.

A three-dimensional object producing apparatus 30 of FIG. 1 includes head units 31 and 32, ultraviolet irradiators 33, rollers 34, a carriage 35, and a stage 37. The head unit 31 is configured to discharge a model part forming material 1. The head units 32 are configured to discharge a support part forming material 2. The rollers 34 are configured to smooth a liquid film of the model part forming material 1 and the support part forming material 2. The ultraviolet irradiators 33 are configured to cure the discharged model part forming material 1 and the discharged support part forming material 2 by irradiation with ultraviolet rays. The carriage 35 is configured to move the respective units such as the head units 31 and 32 in the X direction of FIG. 1 in a go-and-return manner. The stage 37 is configured to move a substrate 36 in the Z direction indicated in FIG. 1 and in the Y direction, which is a direction perpendicular to the sheet of FIG. 1. Instead of the stage 37, the carriage 35 may be configured to move in the Y direction.

When there are a plurality of model part forming materials color by color, the three-dimensional object producing apparatus 30 may include a plurality of head units 31 configured to discharge the model part forming materials of the respective colors. As the nozzles of the head units 31 and 32, nozzles of a publicly-known inkjet printer can be suitably used.

Examples of metals that can be used as the rollers 34 include SUS 303, 400, and 60 series, hexavalent chromium, silicon nitride, and tungsten carbide. Any of these metals may be coated with, for example, fluorine or silicone and used as the rollers 34. Among these metals, SUS 600 series are preferable in terms of strength and processability.

When applying the rollers 34, the three-dimensional object producing apparatus 30 laminates layers while moving down the stage 37 in accordance with the number of times layers are laminated in order to keep a constant gap between the rollers 34 and the surface of the object. In a preferred configuration, the rollers 34 are disposed near the ultraviolet irradiators 33.

The three-dimensional object producing apparatus 30 may have measures against drying of the curable composition (ink) during a halt of the operation, such as caps for closing the nozzles of the head units 31 and 32. Moreover, the three-dimensional object producing apparatus 30 may include a maintenance mechanism configured to maintain the heads in order to inhibit clogging of the nozzles through a long-lasting use.

An object (cured product) producing step that is performed by the three-dimensional object producing apparatus of the present disclosure and in which the discharging step and the curing step are repeated in order will be described below.

While moving the carriage 35 or the stage 37, the engine of the three-dimensional object producing apparatus 30 causes the head unit 31 to discharge liquid droplets of the model part forming material 1 and the head units 32 to discharge liquid droplets of the support part forming material 2 based on two-dimensional data representing the bottommost cross-section among input two-dimensional data. As a result, the liquid droplets of the model part forming material 1 are deployed at the positions corresponding to the pixels indicating the model part in the two-dimensional data representing the bottommost cross-section, the liquid droplets of the support part forming material 2 are deployed at the positions corresponding to the pixels indicating the support part in the same two-dimensional data, and a liquid film in which the liquid droplets of adjoining positions contact each other is formed. When the number of objects to be formed is one, a liquid film having a cross-sectional shape is formed in the center of the stage 37. When the number of objects to be formed is a plural number, the three-dimensional object producing apparatus 30 may form a plurality of liquid films having respective cross-sectional shapes on the stage 37, or may stack a liquid film on an object produced previously.

It is preferable to install heaters in the head units 31 and 32. It is also preferable to install pre-heaters on a path through which the model part forming material is supplied to the head unit 31 and on a path through which the support part forming material is supplied to the head units 32.

In the smoothing step, the rollers 34 smooth out roughness of the liquid film or the layer formed of the model part forming material and the support part forming material by scraping away any excessive portions of the model part forming material and the support part forming material that are discharged onto the stage 37. The smoothing step may be performed once each time a layer is laminated in the Z-axis direction, or may be performed once each time from two through fifty layers are laminated. In the smoothing step, the rollers 34 may be stopped or may rotate at a positive or negative relative speed with respect to the travelling direction of the stage 37. The rotation speed of the rollers 34 may be a constant speed, a constant acceleration, or a constant deceleration. The number of rotations of the rollers 34 expressed as the absolute value of the relative speed with respect to the stage 37 is preferably 50 mm/s or greater and 400 mm/s or less. When the relative speed is extremely low, smoothing is insufficient and smoothness is spoiled. When the relative speed is extremely high, a large-sized apparatus is needed, liquid droplets discharged may fall out of place due to, for example, vibration, and smoothness may be spoiled as a result. In the smoothing step, it is preferable that the rotation direction of the rollers 34 be opposite to the travelling direction of the head units 31 and 32.

In the curing step, the engine of the three-dimensional object producing apparatus 30 causes the carriage 35 to move the ultraviolet irradiators 33, to irradiate the liquid film formed in the discharging step with ultraviolet rays corresponding to the wavelength of the photopolymerization initiator contained in the model part forming material and the support part forming material. Through this operation, the three-dimensional object producing apparatus 30 cures the liquid film and forms a layer.

After the bottommost layer is formed, the engine of the three-dimensional object producing apparatus 30 moves the stage down by a distance corresponding to the thickness of one layer.

The engine of the three-dimensional object producing apparatus 30 causes liquid droplets of the model part forming material 1 and liquid droplets of the support part forming material 2 to be discharged based on two-dimensional image data representing the second cross-section from the bottom while moving the carriage 35 or the stage 37. The discharging method is the same as when the bottommost liquid film is formed. As a result, a liquid film having the cross-sectional shape represented by the second two-dimensional data from the bottom is formed on the bottommost layer. Then, the engine of the three-dimensional object producing apparatus 30 causes the carriage 35 to move the ultraviolet irradiators 33 to irradiate the liquid film with ultraviolet rays, to cure the liquid film and form the second layer from the bottom on the bottommost layer.

The engine of the three-dimensional object producing apparatus 30 repeats forming and curing of a liquid film in the same manner as described above using the input two-dimensional data in the order of data closer to the bottom, to laminate layers. The number of times to repeat varies depending on the number of the input two-dimensional image data or, for example, the height and shape of the three-dimensional model. When object production using all of the two-dimensional image data is completed, a model part object in a state of being supported by a support part is obtained.

The object produced by the three-dimensional object producing apparatus 30 includes the model part and the support part. The support part is removed from the object after object production. The removing method is classified into physical removal and chemical removal. In the physical removal, a mechanical force is applied to remove the support part. On the other hand, in the chemical removal, the support part is disintegrated and removed by immersion in a solvent. The method for removing the support part is not particularly limited, but the chemical removal is more preferable because the object may be broken by the physical removal. Moreover, when costs are taken into consideration, a removing method by immersion in water is more preferable. When the removing method by immersion in water is employed, a support part forming material, of which cured product has water disintegrability, is selected.

A three-dimensional object produced by the three-dimensional object producing method of the present disclosure and the three-dimensional object producing apparatus of the present disclosure has biocompatibility, and has a high strength and a high hardness at the same time as described below. Hence, the three-dimensional object can be suitably used as, for example, dental materials such as an inlay, a crown, a denture, an artificial tooth, and an implant.

(Storage Container)

A storage container stores the curable composition. A container that stores the curable composition can be used as a cartridge or a bottle. Therefore, users can avoid direct contact with the curable composition during operations such as conveyance or replacement of the curable composition, so that fingers and clothes are prevented from contamination. Furthermore, inclusion of foreign matters such as dust in the curable composition can be prevented. In addition, the container can be of any size, any form, and any material. For example, the container can be designed to a particular application. It is preferable to use a light blocking material to block the light or cover a container with a light blocking sheet, etc.

EXAMPLES

The present disclosure will be described in greater detail below by way of the following Examples. The present disclosure should not be construed as being limited to Examples below.

<Preparation of Monomer Blend Liquid A>

According to the blending prescription in Table 1 below, bifunctional ethoxylated bisphenol A methacrylate (product name: NK ESTER BPE-100, obtained from Shin-Nakamura Chemical Co., Ltd.) (70 parts by mass) and bifunctional triethylene glycol methacrylate (product name: NK ESTER 3G, obtained from Shin-Nakamura Chemical Co., Ltd.) (30 parts by mass) were mixed uniformly. Next, diphenyl (2,4, 6-trimethylbenzoyl)phosphine oxide (product name: OMNI-RAD TPO, obtained from BASF GmbH) (5 parts by mass) serving as a photopolymerization initiator, and 4-methoxyphenol (MEHQ, obtained from FUJIFILM Wako Pure Chemical Corporation, Wako First Grade) serving as a polymerization inhibitor were added to the resulting product, and the resulting product was mixed uniformly, to prepare a monomer blend liquid A.

The unit of the blending prescription in Table 1 is "part by mass".

<Preparation of Monomer Blend Liquids B to D>

Monomer blend liquids B to D were prepared in the same manner as that for the monomer blend liquid A according to the blending prescriptions in Table 1 below.

The particulars of the materials used in Table 1 are as follows.

BPE-100: Bifunctional ethoxylated bisphenol A methacrylate, product name: NK ESTER BPE-100, obtained from Shin-Nakamura Chemical Co., Ltd.

UDMA: Urethane acrylate methacrylate resin, product number: 755885, obtained from Sigma-Aldrich Co. LLC 3G: Bifunctional triethylene glycol methacrylate, product name: NK ESTER 3G, obtained from Shin-Nakamura Chemical Co., Ltd.

MMA: Methyl methacrylate, obtained from FUJIFILM Wako Pure Chemical Corporation, Wako Special Grade (Polymerization Initiator)

TPO: OMNIRAD TPO, obtained from BASF GmbH (Polymerization inhibitor)

MEHQ: 4-Methoxyphenol, obtained from FUJIFILM Wako Pure Chemical Corporation, Wako First Grade

TABLE 1

| | | | Monomer blend liquid | | | |
|---|---|---|---|---|---|---|
| | | | A | B | C | D |
| Radical-polymerizable monomer | Bifunctional ethoxylated bisphenol A methacrylate | BPE-100 | 70 | 30 | | 30 |
| | Urethane acrylate methacrylate resin | UDMA | | | 60 | 30 |
| | Bifunctional triethylene glycol methacrylate | 3G | 30 | 70 | 40 | 20 |
| | Methyl methacrylate | MMA | | | | 20 |
| Polymerization initiator | OMNIRAD TPO | | 5 | 5 | 5 | 5 |
| Polymerization inhibitor | MEHQ | | 0.05 | 0.05 | 0.05 | 0.05 |

Example 1

<Production of Curable Composition>

A hard solid component (ADMAFINE K180SM-C5, having an average particle diameter of 180 nm, obtained from Admatechs Co., Ltd.) (10 parts by mass) was added to the monomer blend liquid A (90 parts by mass), and the resulting product was mixed uniformly. Next, the resulting product was passed through a filter (product name: CCP-FX-C1B, obtained from ADVANTEC CO., LTD., having an average pore diameter of 3 μm), to obtain a curable composition of Example 1.

Examples 2 to 12

Curable compositions of Examples 2 to 8 were prepared in the same producing manner as in Example 1 according to the blending prescriptions in Tables 2 to 3 below. The unit of the blending prescriptions in Tables 2 to 3 is "part by mass".

Comparative Example 1

<Preparation of Titanium Oxide Mill Base>

JR-806 (titanium oxide having an average particle diameter of 270 nm, a silica existence percentage of 3% by mass, and an alumina existence percentage of 1% by mass, obtained from Tayca Co., Ltd.) (50 parts by mass) serving as titanium oxide as a comparative hard solid component, a dispersant (SOLSPERSE 24000GR, obtained from Avecia Inc.) (2.5 parts), ARONIX M5700 (obtained from Toagosei Company, Limited) (7.5 parts), adduct of 1,6 hexanediol diacrylate with ethylene oxide (35.2 parts), and 3-methoxy-butyl acrylate (4.8 parts) were stirred and mixed for 1 hour with a stirrer, and then treated for 4 hours with a bead mill, to produce a titanium oxide mill base.

A curable composition of Comparative Example 1 was prepared in the same manner as in Example 1 according to the blending prescription in Table 4 below. The unit of the blending prescription in Table 4 is "part by mass".

Comparative Examples 2 to 4

Curable compositions of Comparative Examples 2 to 4 were prepared in the same producing manner as in Example 1 according to the blending prescriptions in Table 4 below. The unit of the blending prescriptions in Table 4 is "part by mass".

"Refractive index (Rm) of a cured product of the monomer blend liquid", "refractive index (Rs) of the hard solid component", "refractive index difference (Rm−Rs)", "viscosity", and "safety" were measured for the curable compositions obtained, and "total light transmittance" and "bending strength" were measured for cured products obtained by curing the curable compositions in the manners described below. The results are presented in Tables 2 to 4.

<Viscosity Measuring Method>

The viscosity was measured using a cone plate rotary viscometer VISCOMETER TVE-22L (obtained from TOKI SANGYO CO., LTD.). The temperature in the measuring vessel was fixed at 25° C. using a thermostatic circulation tank. As a rotor, a cone rotor (1°34'×R24) was used.

<Safety Evaluation Method>

Safety was checked based on presence or absence of a carcinogenicity label in the safety data sheet (SDS) of all materials used, and was evaluated as "A" (without carcinogenicity) when there was no carcinogenicity label, and as "B" (with carcinogenicity) when there was a carcinogenicity label.

<Total Light Transmittance Measuring Method>

<<Production of Test Piece for Transmittance Measurement>>

As illustrated in FIG. 2, an OHP sheet 41a was placed on a glass substrate 40a, and a silicon mold 42 (shape: a length of 20 mm on each side, and an average thickness of 1 mm) was closely attached on the OHP sheet 41a. Next, the silicon mold 42 was filled with a curable composition 43 and covered with an OHP sheet 41b, which was further covered with a glass substrate 40b.

Next, using an ultraviolet irradiator (obtained from Ushio Inc., UNIJET E110Z HD_385 nm, having a wavelength of 385 nm), the curable composition was irradiated with ultraviolet rays having an irradiation intensity of 200 mW/cm$^2$ for 5 minutes through the glass substrate 40b. Next, the curable composition was irradiated with ultraviolet rays having an irradiation intensity of 500 mW/cm$^2$ for 5 minutes through the glass substrate 40a at the side opposite to the side irradiated with ultraviolet rays just before. Next, the OHP sheet 41b was peeled, and the test piece, which was a cured product of the curable composition 43, was taken out from the silicon mold 42 and left in a stationary state in an environment at a temperature of 23° C. at a relative humidity of 50% for 24 hours, to obtain a test piece having an average thickness of 1 mm.

<<Total Light Transmittance Measuring Method>>

The total light transmittance (Tt) through the test piece produced above in the thickness direction was measured using DIRECT READING HAZEMETER (obtained from Toyo Seiki Seisaku-sho, Ltd.) according to JIS K7361-1/HAZE:JIS K7136, and evaluated according to the evaluation criterial described below. B and A are practically usable levels at which whiteness is high.

[Evaluation Criteria]

A: The total light transmittance (Tt) was 30% or lower.

B: The total light transmittance (Tt) was higher than 30% and 40% or lower.

C: The total light transmittance (Tt) was higher than 40%.

21

<Bending Strength Measuring Method>

A test piece for bending strength measurement was produced in the same manner as in the production of the test piece for transmittance measurement, except that the size was changed to 40 mm in length, 10 mm in width, and 1 mm in average thickness.

The bending strength of each obtained cured product having a rectangular shape was measured in the manner described below. For measuring the bending strength of each three-dimensional object, a universal tester (AUTOGRAPH, model No. AG-I, obtained from Shimadzu Corporation), a load cell for 1 kN, and a three-point bending jig were used. Stress that would occur when the distance between the fulcrums was 24 mm and the load point was displaced at a speed of 1 mm/minute was plotted with respect to the amount of strain, and the stress at the breaking point was determined as the maximum stress. B and A are practically usable levels.

[Evaluation Criteria]

A: The bending strength was 120 MPa or higher.

B: The bending strength was 100 MPa or higher and lower than 120 MPa.

C: The bending strength was 100 MPa or lower.

22

<Method for Measuring Refractive Index ($n_1$) of Cured Product of Monomer Blend Liquid, Refractive Index ($n_2$) of Hard Solid Component, and Absolute Value ($|n_1 - n_2|$) of Refractive Index Difference>

The refractive index was measured using an Abbe's refractometer NAR-1T (obtained from Atago Co., Ltd.) under D-rays (589.3 nm) of a light source lamp.

As the refractive index of the hard solid component, the hard solid component (commercial product) was used for the measurement as is, and the refractive index was measured by the B method using the Abbe's refractometer and stipulated by JIS K 7142.

For evaluation of the refractive index of a cured product of each monomer blend liquid, first, a test piece, which was a cured product of each monomer blend liquid, was produced in the same manner as the method for producing the test piece for transmittance measurement, except that each monomer blend liquid was used instead of the curable composition. Next, the test piece was shaved with waterproof abrasive paper #400, and the refractive index of the obtained particles of the test piece was measured by the B method using the Abbe's refractometer and stipulated by JIS K 7142.

TABLE 2

| | | | Ex. | | | | | |
| | | | 1 | 2 | 3 | 4 | 5 | 6 |
|---|---|---|---|---|---|---|---|---|
| Curable composition | Monomer blend liquid | A | 90 | 70 | 70 | | | 90 |
| | | B | | | | 70 | 70 | |
| | | C | | | | | | |
| | | D | | | | | | |
| | Hard solid component | ADMANANO YA100SM-C6 (avg. particle dia: 100 nm) | | | | | | 10 |
| | | ADMAFINE K180SM-C5 (avg. particle dia: 180 nm) | 10 | 30 | | | | |
| | | ADMAFINE 3SM-C11 (avg. particle dia: 300 nm) | | | | 30 | 30 | |
| | | ADMAFINE SC2500-SMJ (avg. particle dia: 500 nm) | | | 30 | | | |
| | | ADMANANO Y100SP-C1 (avg. particle dia: 100 nm) modified with Ph silane | | | | | | |
| | | Titanium oxide mill base | | | | | | |
| | Volume % (vol %) of solid component | | 5.8 | 19.1 | 19.1 | 18.9 | 18.9 | 5.8 |
| | Refractive index (n1) of cured product of monomer blend liquid | | 1.539 | 1.539 | 1.539 | 1.511 | 1.511 | 1.539 |
| | Average refractive index (n2) of hard solid component | | 1.460 | 1.460 | 1.460 | 1.460 | 1.460 | 1.460 |
| | Absolute value |n1 − n2| of refractive index difference | | 0.079 | 0.079 | 0.079 | 0.051 | 0.051 | 0.079 |
| Evaluation result | Total light transmittance of 3D object | | B | A | A | A | A | B |
| | Bending hardness of 3D object | | B | A | B | B | B | A |
| | Viscosity (mPa · s) of curable composition | | 167 | 403 | 370 | 51 | 239 | 190 |
| | Safety (carcinogenicity) | | A | A | A | A | A | A |

TABLE 3

| | | | Ex. | | | | | |
| | | | 7 | 8 | 9 | 10 | 11 | 12 |
|---|---|---|---|---|---|---|---|---|
| Curable composition | Monomer blend liquid | A | 70 | | | | | |
| | | B | | | | | | 50 |
| | | C | | | | 70 | 70 | |
| | | D | | 70 | 70 | | | |
| | Hard solid component | ADMANANO YA100SM-C6 (avg. particle dia: 100 nm) | 30 | | | | | |

TABLE 3-continued

| | | Ex. | | | | | |
|---|---|---|---|---|---|---|---|
| | | 7 | 8 | 9 | 10 | 11 | 12 |
| | ADMAFINE K180SM-C5 (avg. particle dia: 180 nm) | | 30 | | | | |
| | ADMAFINE 3SM-C11 (avg. particle dia: 300 nm) | | | 30 | 30 | | 50 |
| | ADMAFINE SC2500-SMJ (avg. particle dia: 500 nm) | | | | | | |
| | ADMANANO Y100SP-C1 (avg. particle dia: 100 nm) modified with Ph silane | | | | | 30 | |
| | Titanium oxide mill base | | | | | | |
| | Volume % (vol %) of solid component | 19.1 | 18.7 | 18.7 | 19.0 | 19.0 | 35.2 |
| | Refractive index (n1) of cured product of monomer blend liquid | 1.539 | 1.520 | 1.520 | 1.508 | 1.508 | 1.508 |
| | Average refractive index (n2) of hard solid component | 1.460 | 1.460 | 1.460 | 1.460 | 1.460 | 1.460 |
| | Absolute value $|n1 - n2|$ of refractive index difference | 0.079 | 0.060 | 0.060 | 0.048 | 0.048 | 0.048 |
| Evaluation result | Total light transmittance of 3D object | A | B | B | B | B | A |
| | Bending hardness of 3D object | A | A | A | A | B | A |
| | Viscosity (mPa · s) of curable composition | 370 | 120 | 140 | 400 | 230 | 240 |
| | Safety (carcinogenicity) | A | A | A | A | A | A |

25

TABLE 4

| | | | Comp. Ex. | | | |
|---|---|---|---|---|---|---|
| | | | 1 | 2 | 3 | 4 |
| Curable composition | Monomer blend liquid | A | 90 | 97 | | |
| | | B | | | 30 | 30 |
| | | C | | | | |
| | | D | | | | |
| | Hard solid component | ADMANANO YA100SM-C6 (avg. particle dia: 100 nm) | | | 70 | |
| | | ADMAFINE K180SM-C5 (avg. particle dia: 180 nm) | | 3 | | |
| | | ADMAFINE 3SM-C11 (avg. particle dia: 300 nm) | | | | |
| | | ADMAFINE SC2500-SMJ (avg. particle dia: 500 nm) | | | | 70 |
| | | ADMANANO Y100SP-C1 (avg. particle dia: 100 nm) modified with Ph silane | | | | |
| | | Titanium oxide mill base | 10 | | | |
| | Volume % (vol %) of solid component | | 1.4 | 1.7 | 55.9 | 55.9 |
| | Refractive index (n1) of cured product of monomer blend liquid | | 1.539 | 1.539 | 1.508 | 1.508 |
| | Average refractive index (n2) of hard solid component | | 2.720 | 1.460 | 1.460 | 1.460 |
| | Absolute value $|n1 - n2|$ of refractive index difference | | 1.181 | 0.079 | 0.048 | 0.048 |
| Evaluation result | Total light transmittance of 3D object | | A | C | A | A |
| | Bending hardness of 3D object | | C | C | A | C |
| | Viscosity (mPa · s) of curable composition | | 200 | 135 | >2,000 | 480 |
| | Safety (carcinogenicity) | | B | A | A | A |

55

The particulars of the hard solid component used in Examples and Comparative Examples are as follows.
(Hard Solid Component)

ADMAANANO YA100CSM-C6: Surface-modified silica particles, having a volume average particle diameter of 100 nm, obtained from Admatechs Co., Ltd.

ADMAFINE K180SM-C5: Surface-modified silica particles, having a volume average particle diameter of 180 nm, obtained from Admatechs Co., Ltd.

ADMAFINE 3SM-C11: Surface-modified silica particles, having a volume average particle diameter of 300 nm, obtained from Admatechs Co., Ltd.

ADMAFINE SC2500-SMJ: Surface-modified silica particles, having a volume average particle diameter of 500 nm, obtained from Admatechs Co., Ltd.

ADMANANO YA100SP-C1: Surface-modified silica particles (modified with phenyl silane), silica particles, having a volume average particle diameter of 100 nm, obtained from Admatechs Co., Ltd.

Titanium oxide: JR-806, titanium oxide having an average particle diameter of 270 nm (having a silica existence percentage of 3% by mass and an alumina existence percentage of 1% by mass), obtained from Tayca Co., Ltd.

ADMAFINE was produced by a Vaporized Metal Combustion (VMC) method (which is a method of cooling silicon vaporized by combustion, to obtain particles), and had a broad granularity distribution.

On the other hand, ADMANANO was produced by a wet synthesizing method and had a sharp granularity distribution.

Any of these kinds of surface-modified silica particles was silica that was surface-modified with a silane coupling agent. The surface-modified silica particles other than ADMANANO YA100SP-C1 were silica that was surface-modified with a silane coupling agent containing an unsaturated double bond.

All of the curable compositions of Examples 1 to 12 had a viscosity of 1,000 cp or lower, and could be discharged stably from an inkjet head.

As compared with Comparative Examples, the curable compositions and the three-dimensional objects of Examples 1 to 12 were free of titanium oxide and highly safe, and it was revealed that the three-dimensional objects obtained by curing the curable compositions had a high whiteness owing to an excellent total light transmittance through the objects, and also had an improved strength.

In contrast, in Comparative Example 1 in which titanium oxide, which was a white pigment having a high hiding power, was used, it was revealed that whiteness after curing was high, but that safety was poor and strength after curing was not sufficient. In Comparative Example 2 in which the content of the hard solid component was less than 3% by volume, it was revealed that the total light transmittance through the cured product was so extremely high that whiteness could not be obtained, and that strength after curing was not sufficient. In Comparative Examples 3 and 4 in which the content of the hard solid component was greater than 40% by volume, it was revealed that the curable composition of Comparative Example 3 in which the quantity of a hard solid component having an average particle diameter of 100 nm was increased had a high viscosity and was not suitable for inkjet discharging, and that the curable composition of Comparative Example 4 in which the quantity of a hard solid component having an average particle diameter of 500 nm was increased could not obtain a sufficient strength after curing.

Aspects of the present disclosure are, for example, as follows.

<1> A curable composition, including:
a radical-polymerizable monomer; and
a hard solid component having a volume average particle diameter of 10 nm or greater and 1,000 nm or less,
wherein a content of the hard solid component is 3% by volume or greater and 40% by volume or less, and
an absolute value ($|n_1-n_2|$) of a difference between a refractive index ($n_1$) of a cured product of any other component than the hard solid component and a refractive index ($n_2$) of the hard solid component is 0.04 or greater.
<2> The curable composition according to <1>,
wherein the difference between the refractive indices is 0.05 or greater.
<3> The curable composition according to <2>,
wherein the difference between the refractive indices is 0.07 or greater.
<4> The curable composition according to any one of <1> to <3>,
wherein the hard solid component is silica that is surface-modified with a silane coupling agent.

<5> The curable composition according to <4>,
wherein the silane coupling agent contains an unsaturated double bond.
<6> The curable composition according to any one of <1> to <5>,
wherein a viscosity of the curable composition at 25° C. is 1,000 mPa·s or lower.
<7> The curable composition according to any one of <1> to <6>,
wherein the content of the hard solid component is 5% by volume or greater and 30% by volume or less relative to a whole amount of the curable composition.
<8> The curable composition according to any one of <1> to <7>,
wherein the volume average particle diameter of the hard solid component is 100 nm or greater and 500 nm or less.
<9> The curable composition according to <8>,
wherein the volume average particle diameter of the hard solid component is 180 nm or greater and 500 nm or less.
<10> The curable composition according to any one of <1> to <9>,
wherein the radical-polymerizable monomer contains a (meth)acrylic-based monomer.
<11> The curable composition according to any one of <1> to <10>, further including
a polymerization initiator,
wherein a content of the polymerization initiator is 0.1% by mass or greater and 10.0% by mass or less relative to a whole amount of the curable composition.
<12> The curable composition according to any one of <1> to <11>, further including
a radical-polymerizable oligomer.
<13> The curable composition according to <12>,
wherein the radical-polymerizable oligomer contains a urethane group.
<14> The curable composition according to <12> or <13>,
wherein a content of the radical-polymerizable oligomer is 1.0% by mass or greater and 40.0% by mass or less relative to a whole amount of the curable composition.
<15> A three-dimensional object producing method, including:
discharging the curable composition according to any one of <1> to <14> by an inkjet method; and
curing the curable composition discharged, by irradiation with active energy rays,
wherein the three-dimensional object producing method includes repeating the discharging and the curing in order.
<16> A three-dimensional object producing apparatus, including:
a discharging unit configured to discharge the curable composition according to any one of <1> to <14> by an inkjet method; and
a curing unit configured to cure the curable composition discharged, by irradiation with active energy rays.
<17> An artificial tooth object, including
a hard solid component having a volume average particle diameter of 10 nm or greater and 1,000 nm or less,
wherein a content of the hard solid component is 3% by volume or greater and 40% by volume or less,
an absolute value ($|n_1-n_2|$) of a difference between a refractive index ($n_1$) of a cured product of any other component than the hard solid component and a refractive index ($n_2$) of the hard solid component is 0.04 or greater,

the hard solid component is spherical particles, and 50% by number of primary particles of the spherical particles are distributed separately from one another, and a total light transmittance through the artificial tooth object having an average thickness of 1 mm is 30% or lower.

The curable composition according to any one of <1> to <14> can solve the various problems in the related art and achieve the object of the present disclosure.

The three-dimensional object producing method according to <15> and the three-dimensional object producing apparatus according to <16> aim for solving the various problems in the related art and achieving an object described below. That is, the three-dimensional object producing method and the three-dimensional object producing apparatus have an object to provide a three-dimensional object producing method and a three-dimensional object producing apparatus that can produce, by an inkjet method, a three-dimensional object free of titanium oxide and highly safe, and having a high strength and a high whiteness after curing.

The artificial tooth object according to <17> aims for solving the various problems in the related art and achieving an object described below. That is, the artificial tooth object has an object to provide an artificial tooth object free of titanium oxide and highly safe, and having a high strength and a high whiteness after curing. Further, the present invention is not limited to these embodiments, but various variations and modifications may be made without departing from the scope of the present invention.

What is claimed is:

1. A curable composition, comprising:
a radical-polymerizable monomer; and
a hard solid component having a volume average particle diameter of 10 nm or greater and 1,000 nm or less,
wherein a content of the hard solid component is 3% by volume or greater and 40% by volume or less,
an absolute value ($|n_1-n_2|$) of a difference between a refractive index ($n_1$) of a cured product of any other component than the hard solid component and a refractive index ($n_2$) of the hard solid component is 0.04 or greater, and
a viscosity of the curable composition at 25° C. is 1,000 mPa·s or lower.

2. The curable composition according to claim 1, wherein the difference between the refractive indices is 0.05 or greater.

3. The curable composition according to claim 2, wherein the difference between the refractive indices is 0.07 or greater.

4. The curable composition according to claim 1, wherein the hard solid component is silica that is surface-modified with a silane coupling agent.

5. The curable composition according to claim 4, wherein the silane coupling agent contains an unsaturated double bond.

6. The curable composition according to claim 1, wherein the content of the hard solid component is 5% by volume or greater and 30% by volume or less relative to a whole amount of the curable composition.

7. The curable composition according to claim 1, wherein the volume average particle diameter of the hard solid component is 100 nm or greater and 500 nm or less.

8. The curable composition according to claim 7, wherein the volume average particle diameter of the hard solid component is 180 nm or greater and 500 nm or less.

9. The curable composition according to claim 1, wherein the radical-polymerizable monomer contains a (meth)acrylic-based monomer.

10. The curable composition according to claim 1, further comprising:
a polymerization initiator,
wherein a content of the polymerization initiator is 0.1% by mass or greater and 10.0% by mass or less relative to a whole amount of the curable composition.

11. The curable composition according to claim 1, further comprising:
a radical-polymerizable oligomer.

12. The curable composition according to claim 11, wherein the radical-polymerizable oligomer contains a urethane group.

13. The curable composition according to claim 11, wherein a content of the radical-polymerizable oligomer is 1.0% by mass or greater and 40.0% by mass or less relative to a whole amount of the curable composition.

14. A three-dimensional object producing method, comprising:
discharging the curable composition according to claim 1 by an inkjet method; and
curing the curable composition discharged, by irradiation with active energy rays,
wherein the three-dimensional object producing method includes repeating the discharging and the curing in order.

15. A three-dimensional object producing apparatus, comprising:
a storage container storing the curable composition according to claim 1;
a discharging unit configured to discharge the curable composition by an inkjet method; and
a curing unit configured to cure the curable composition discharged, by irradiation with active energy rays.

16. An artificial tooth object, comprising:
a hard solid component having a volume average particle diameter of 10 nm or greater and 1,000 nm or less,
wherein a content of the hard solid component is 3% by volume or greater and 40% by volume or less,
an absolute value ($|n_1-n_2|$) of a difference between a refractive index ($n_1$) of a cured product of any other component than the hard solid component and a refractive index ($n_2$) of the hard solid component is 0.04 or greater,
the hard solid component is spherical particles, and 50% by number of primary particles of the spherical particles are distributed separately from one another, and
a total light transmittance through the artificial tooth object having an average thickness of 1 mm is 30% or lower, and
said artificial tooth object is obtained by irradiating the curable composition according to claim 1, with active energy rays or heating.

* * * * *